(12) United States Patent
Hsiung et al.

(10) Patent No.: US 8,953,259 B2
(45) Date of Patent: Feb. 10, 2015

(54) PROJECTION LENS

(75) Inventors: Chien-Chih Hsiung, Taichung (TW);
Yu-Hsiang Huang, Taichung (TW);
Yun-Yi Lin, Taichung (TW)

(73) Assignee: Asia Optical International Ltd., Tortola, B.V.I. (GB)

( * ) Notice: Subject to any disclaimer, the term of this patent is extended or adjusted under 35 U.S.C. 154(b) by 50 days.

(21) Appl. No.: 13/615,332

(22) Filed: Sep. 13, 2012

(65) Prior Publication Data

US 2013/0163097 A1    Jun. 27, 2013

(30) Foreign Application Priority Data

Dec. 27, 2011    (TW) .............................. 100149012 A

(51) Int. Cl.
*G02B 9/00*    (2006.01)
*G02B 9/34*    (2006.01)

(52) U.S. Cl.
CPC ... *G02B 9/00* (2013.01); *G02B 9/34* (2013.01)
USPC ............ 359/715; 359/676; 359/686; 359/687

(58) Field of Classification Search
CPC .......... G02B 13/16; G02B 13/18; G02B 9/34; G02B 27/18; G02B 21/36
USPC .................. 359/650, 715, 649, 740
See application file for complete search history.

(56) References Cited

U.S. PATENT DOCUMENTS

| | | | | | |
|---|---|---|---|---|---|
| 5,822,129 | A | * | 10/1998 | Sekine | 359/651 |
| 7,079,325 | B2 | * | 7/2006 | Konno | 359/682 |
| 7,348,575 | B2 | * | 3/2008 | Omura | 250/492.2 |
| 2002/0060859 | A1 | * | 5/2002 | Yoneyama | 359/749 |
| 2004/0246362 | A1 | * | 12/2004 | Konno | 348/335 |
| 2007/0285802 | A1 | * | 12/2007 | Sugita | 359/689 |
| 2008/0037112 | A1 | * | 2/2008 | Ulrich et al. | 359/365 |
| 2008/0180811 | A1 | * | 7/2008 | Nishimura | 359/692 |
| 2010/0020411 | A1 | * | 1/2010 | Yamamoto | 359/684 |
| 2010/0045808 | A1 | * | 2/2010 | Matsusaka et al. | 348/220.1 |
| 2010/0208358 | A1 | * | 8/2010 | Minefuji | 359/682 |
| 2011/0007401 | A1 | * | 1/2011 | Amano | 359/649 |

* cited by examiner

*Primary Examiner* — Ricky Mack
*Assistant Examiner* — William Alexander
(74) *Attorney, Agent, or Firm* — Tracy M. Heims; Apex Juris, PLLC

(57) ABSTRACT

A projection lens, in order along an optical axis from an image formation side to an image source side, includes a first lens, an aperture, a second lens, a third lens, and a fourth lens. The first lens is a meniscus lens with positive refractive power and a convex surface thereof facing the image formation side, and has at least an aspheric surface. The second lens is a biconcave lens with negative refractive power, and has at least an aspheric surface. The third lens is a biconvex lens with positive refractive power, and the fourth lens is a biconvex lens with positive refractive power, and has at least an aspheric surface. Therefore, the projection lens has a small size and high zoom ratio.

8 Claims, 5 Drawing Sheets

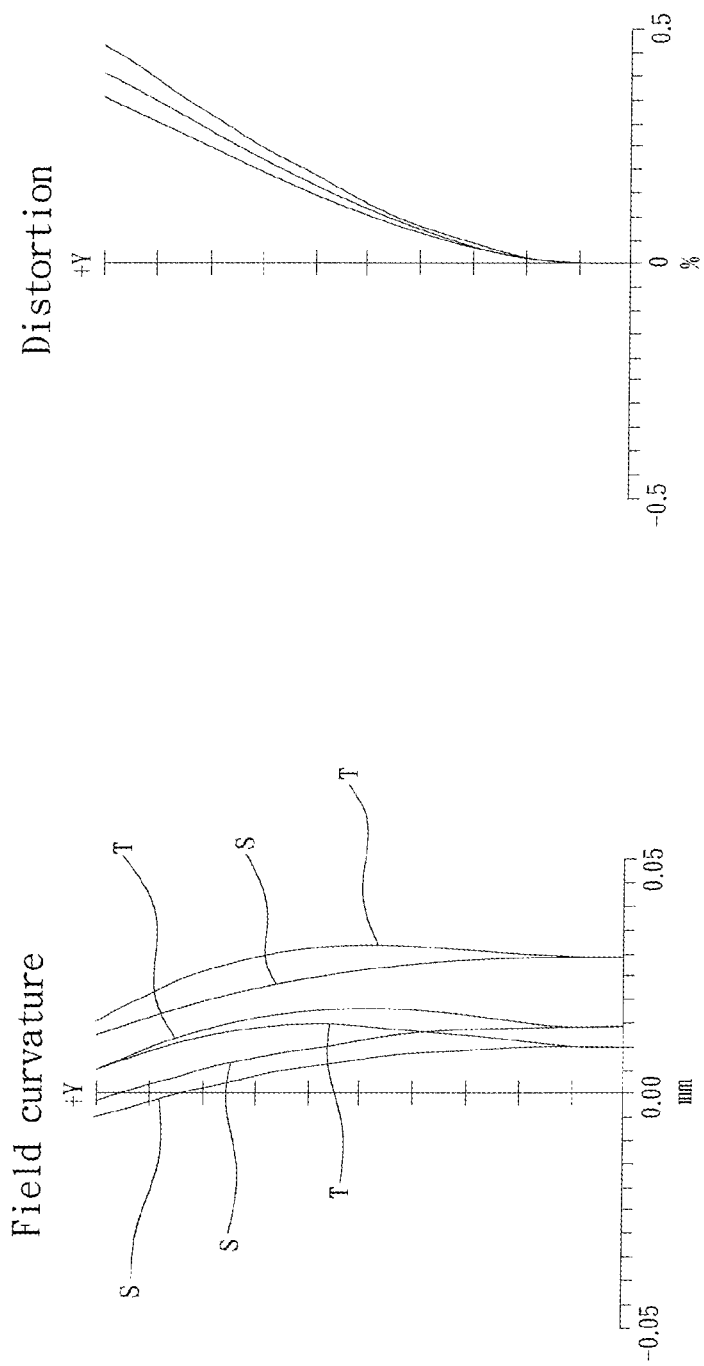

PROJECTION LENS

BACKGROUND OF THE INVENTION

1. Field of the Invention

The present invention relates generally to a lens module, and more particularly to a projection lens.

2. Description of the Related Art

As the improvement of image technology, more and more people use projector in presentation, video conference, meeting, and video watching. In order to improve the portability of the projector, the lens, which is mounted on the projector, is asked to be as smaller and lighter as possible for a micro projector. The lens are asked to have high optical performance also except for the weight and size to project images with high image resolution and contrast. Therefore, size and optical performance are the first two important facts for the lens of micro-projector.

In order to increase optical performance, the lenses usually have a lot of lens groups therein, and some of them even have more than a dozen. On the contrary, in order to reduce size and weight, some lenses only have a few lenses, and, however, this kind of lens module couldn't provide a good optical performance.

Therefore, there still are some places that need to improve in the conventional lens for the micro projector.

SUMMARY OF THE INVENTION

The primary objective of the present invention is to provide a projection lens, which has a small size and a high optical performance.

According to the objective of the present invention, a projection lens for a micro projector, in order along an optical axis from an image formation side to an image source side, includes a first lens, an aperture, a second lens, a third lens, and a fourth lens. The first lens is a meniscus lens with positive refractive power and a convex surface thereof facing the image formation side, and has at least an aspheric surface. The second lens is a biconcave lens with negative refractive power, and has at least an aspheric surface. The third lens is a biconvex lens with positive refractive power, and the fourth lens is a biconvex lens with positive refractive power, and has at least an aspheric surface.

In an embodiment, the projection lens satisfies the following conditions:

$$42\ mm < f1 < 52\ mm; \quad (1)$$

$$-4.8\ mm < f2 < -4.3\ mm; \quad (2)$$

$$7\ mm < f3 < 7.8\ mm; \quad (3)$$

$$9\ mm < f4 < 10\ mm; \quad (4)$$

where $f1$ is the effective focus length of the first lens L1;
$f2$ is the effective focus length of the second lens L2;
$f3$ is the effective focus length of the third lens L3; and
$f4$ is the effective focus length of the fourth lens L4.

Therefore, the projection lens of the present invention may reduce size and weight thereof, and furthermore, it may provide a high optical performance.

BRIEF DESCRIPTION OF THE DRAWINGS

FIG. 2A is a field curvature diagram of the preferred embodiment of the present invention;

FIG. 2B is a distortion diagram of the preferred embodiment of the present invention;

DETAILED DESCRIPTION OF THE INVENTION

Figure 1:
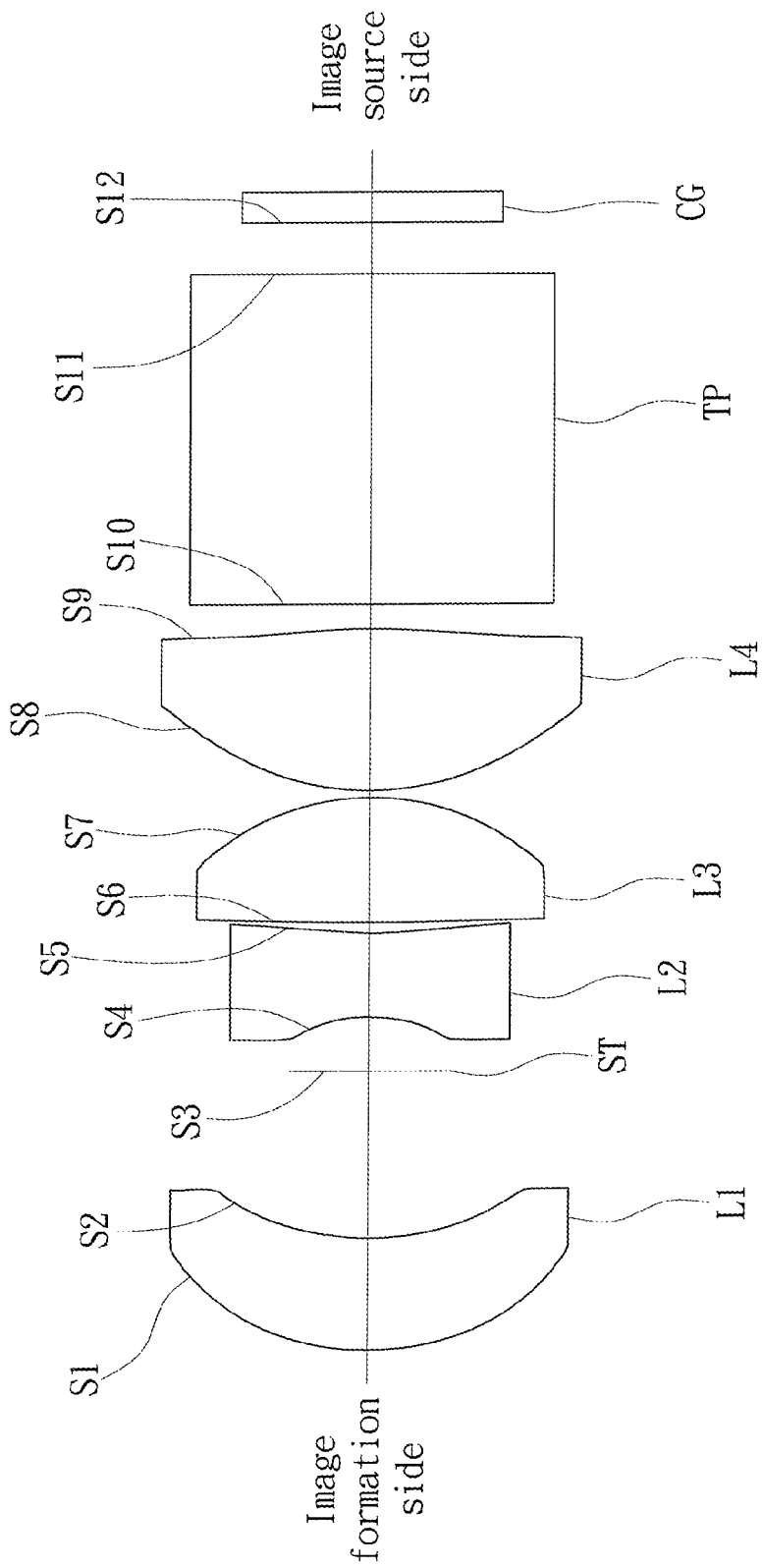
FIG. 1 is a sketch diagram of the arrangement of the lenses of a preferred embodiment of the present invention.

As shown in FIG. 1, a projection lens for a micro projector of the preferred embodiment of the present includes, in sequence along an optical axis Z from an image formation side to an image source side, a first lens L1, an aperture ST, a second lens L2, a third lens L3, and a fourth lens L4. After the fourth lens L4, the projection lens further has a total internal reflection prism TP and a cover glass CG in sequence from the fourth lens L4 to the image source side. The total internal reflection prism TP and the cover glass CG are conventional devices, so we do not describe the detail here.

The first lens L1 is a plastic meniscus lens with positive refractive power, and its convex surface S1 faces the image formation side. Both sides S1, S2 of the first lens L1 are aspheric surfaces.

The second lens L2 is a plastic biconcave lens with negative refractive power, and both sides S4, S5 thereof are aspheric surfaces.

The third lens L3 is a glass biconvex lens with positive refractive power, and both sides S6, S7 thereof are spheric surfaces.

The fourth lens L4 is a plastic biconvex lens with positive refractive power, and both sides S8, S9 thereof are aspheric surfaces.

In order to obtain high image quality, enhanced imaging power, lower chromatic aberration and distortion, the projection lens of the present invention satifies the following conditions:

$$42\text{ mm} < f1 < 52\text{ mm};\quad (1)$$

$$-4.8\text{ mm} < f2 < -4.3\text{ mm};\quad (2)$$

$$7\text{ mm} < f3 < 7.8\text{ mm};\quad (3)$$

$$9\text{ mm} < f4 < 10\text{ mm};\quad (4)$$

where f1 is the effective focus length of the first lens L1;
f2 is the effective focus length of the second lens L2;
f3 is the effective focus length of the third lens L3; and
f4 is the effective focus length of the fourth lens L4.

The focus length (F), the F-number (FNO), the radius of curvature at the optical axis Z of each lens (R), the thickness at the optical axis Z of each lens (T), interval between the lenses (I), the refractive index (Nd), and the Abbe number (Vd) are shown in Table 1.

TABLE 1

F = 7.933
FNO = 1.51

| surfaces | R (mm) | T (mm) | I (mm) | Nd | Vd | note |
|---|---|---|---|---|---|---|
| S1 | 6.7 | 2.75 | | 1.61422 | 25.576511 | L1 |
| S2 | 7.4 | | 4.05 | | | |
| S3 | | | 1.25 | | | ST |
| S4 | −4.2 | 1.95 | | 1.61422 | 25.576511 | L2 |
| S5 | 10.5 | | 0.2 | | | |
| S6 | 118.5 | 3 | | 1.772499 | 49.60134 | L3 |
| S7 | −6 | | 0.2 | | | |
| S8 | 6.5 | 3.8 | | 1.53116 | 56.043828 | L4 |
| S9 | −18.5 | | 0.6 | | | |
| S10 | ∞ | 7 | | 1.846663 | 23.784819 | TP |
| S11 | ∞ | | 1.3 | | | |
| S12 | ∞ | 0.7 | | | | CG |

The depression z of each aspheric surface S1, S2, S4, S5, S8, and S9 may be obtained by the following equation:

$$z = \frac{ch^2}{1 + [1 - (k+1)c^2 h^2]^{\frac{1}{2}}} + Ah^4 + Bh^6 + Ch^8 + Dh^{10} + Eh^{12} + Fh^{14} + Gh^{16}$$

where z is the depression of the aspheric surface;
c is the reciprocal of radius of curvature;
h is the radius of aperture on the surface;
k is conic constant;
A~G are coefficients of the radius of aperture h.

The conic constants (k) of the aspheric surfaces and the coefficients A~G of the radius of aperture on the surface (h) are shown in Table 2.

The lenses and the apertures ST as described above may reduce the size and weight of the projection lens of the present invention, and the projection lens still keeps a good optical performance as shown in FIG. 2A to FIG. 2E.

Figure 2C:
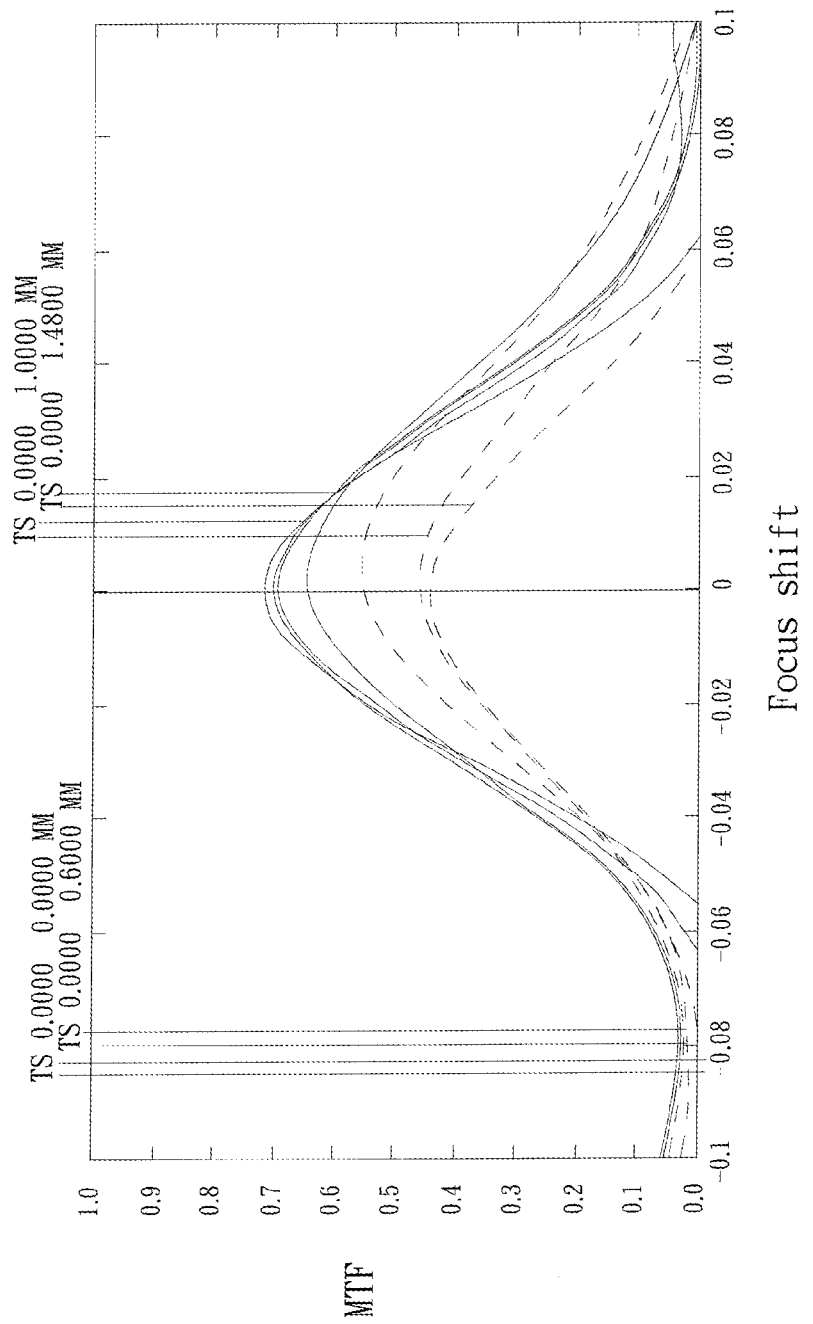
FIG. 2C is a through focus MTF of the preferred embodiment of the present invention.
Figure 2D:
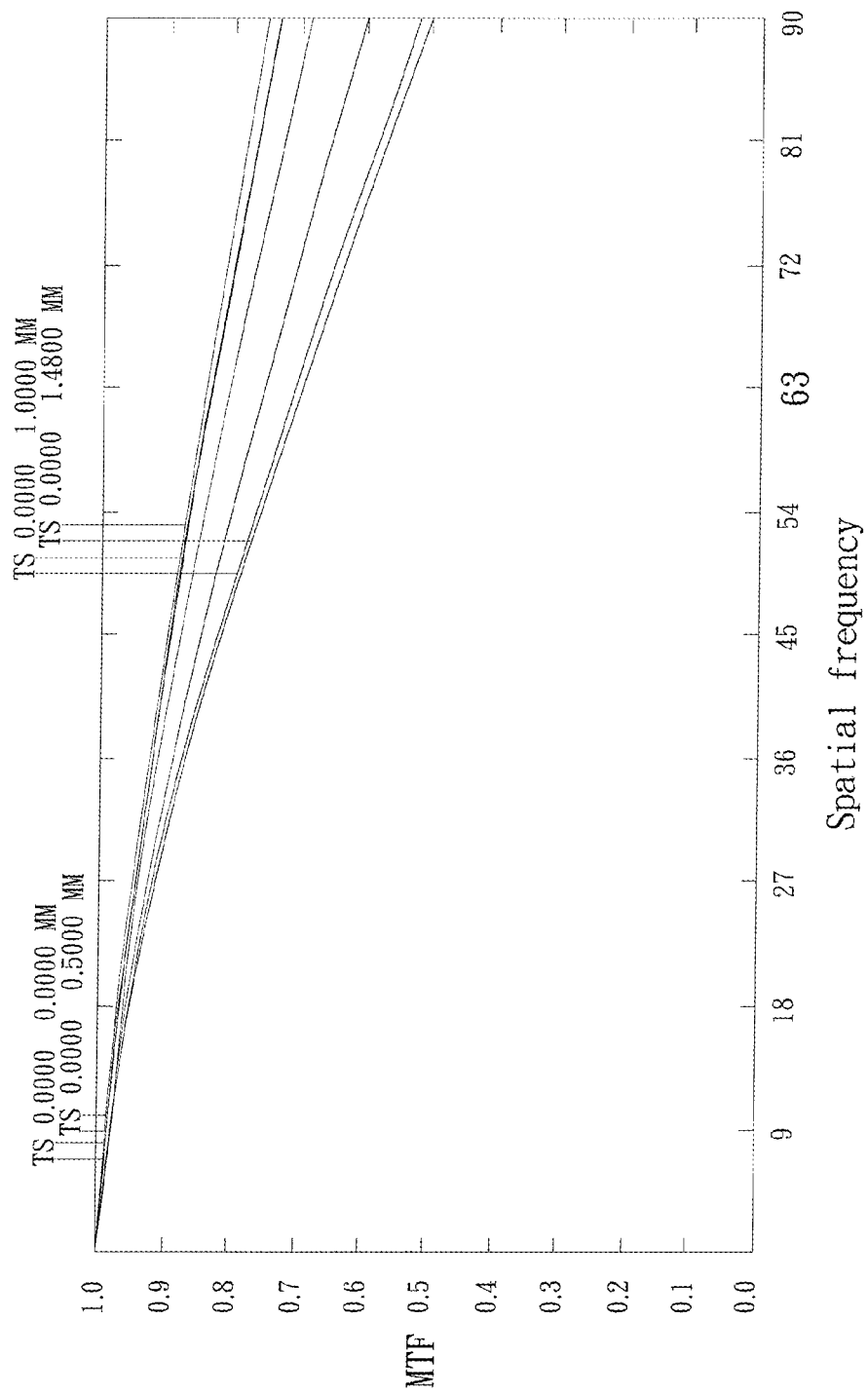
FIG. 2D is a spatial frequency MTF of the preferred embodiment of the present invention.
Figure 2E:
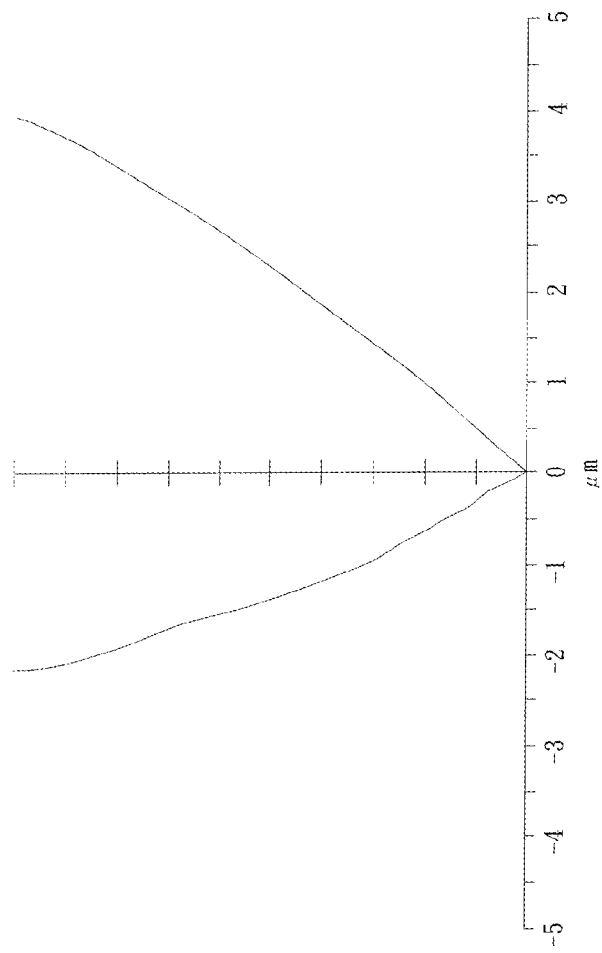
FIG. 2E is a lateral color diagram of the preferred embodiment of the present invention.

In FIG. 2A, it shows the maximum distortion is less than −6.4%. In FIG. 2B, it shows that the maximum field curvature is less than −0.005 mm and 0.05 mm. FIG. 2C shows that the image resolutions are acceptable in all fields. FIG. 2D shows that MTF is greater than 50% in 90 lp/mm, and FIG. 2E shows that the lateral color is less than a pixel between red R, blue B and green G. The results show that the image resolution of the projection lens of the present invention is acceptable.

In conclusion, the projection lens of the present invention may reduce the size and weight thereof, and furthermore, it may provide a high optical performance.

The description above is a few preferred embodiments of the present invention and the equivalence of the present invention is still in the scope of claim construction of the present invention.

What is claimed is:

1. A projection lens, in order along an optical axis from an image formation side to an image source side, comprising:
    a first lens, which is a meniscus lens with positive refractive power and a convex surface thereof facing the image formation side, having at least an aspheric surface;
    an aperture;
    a second lens, which is a biconcave lens with negative refractive power, having at least an aspheric surface;
    a third lens, which is a biconvex lens with positive refractive power; and
    a fourth lens, which is a biconvex lens with positive refractive power, having at least an aspheric surface;
    wherein the fourth lens has a condition of 9 mm<f4<10 mm, where f4 is an effective focus length of the fourth lens.

2. The projection lens as defined in claim 1, wherein both sides of the first lens are aspheric surfaces.

3. The projection lens as defined in claim 1, wherein both sides of the second lens are aspheric surfaces.

4. The projection lens as defined in claim 1, wherein both sides of the fourth lens are aspheric surfaces.

5. The projection lens as defined in claim 1, wherein the first lens has a condition of 42 mm<f1<52 mm, where f1 is an effective focus length of the first lens.

6. The projection lens as defined in claim 1, wherein the second lens has a condition of −4.8 mm<f2<−4.3 mm, where f2 is an effective focus length of the second lens.

7. The projection lens as defined in claim 1, wherein the third lens has a condition of 7 mm<f3<7.8 mm, where f3 is an effective focus length of the third lens.

TABLE 2

| surfaces | k | A | B | C | D | E | F | G |
|---|---|---|---|---|---|---|---|---|
| S1 | −1.37E+00 | 1.03E−03 | 1.45E−05 | −4.46E−07 | 5.40E−08 | −7.36E−10 | 0 | 0 |
| S2 | 1.84E+00 | 3.31E−04 | −1.18E−05 | −4.80E−07 | 8.93E−08 | −1.36E−08 | 0 | 0 |
| S4 | 3.16E−01 | −5.89E−03 | 7.35E−04 | −1.53E−04 | −2.51E−06 | 2.07E−06 | 0 | 0 |
| S5 | −3.23E+01 | −1.15E−03 | 1.33E−05 | 1.31E−06 | −8.61E−09 | −8.24E−10 | 0 | 0 |
| S8 | −1.88E−01 | −1.74E−04 | 1.25E−05 | −8.84E−07 | 3.01E−08 | −5.23E−10 | 0 | 0 |
| S9 | 7.49E−01 | 1.06E−03 | −2.64E−06 | 2.61E−07 | −2.85E−08 | 4.45E−10 | 0 | 0 |

8. The projection lens as defined in claim 1, wherein the first lens, the second lens and the fourth lens are made of plastic, and the third lens is made of glass.

* * * * *